United States Patent Office 2,971,030
Patented Feb. 7, 1961

2,971,030
A DIACETYL BENZOPHENONE AND PROCESS OF PREPARATION

Robert L. Hudson, Midland, Mich., assignor to The Dow Chemical Company, Midland, Mich., a corporation of Delaware No Drawing. Filed Sept. 22, 1958, Ser. No. 762,224

2 Claims. (Cl. 260—591)

The present invention is directed to 3,5-diacetyl-2,6-dihydroxybenzophenone and to a method for its preparation. The novel compound corresponds to the formula

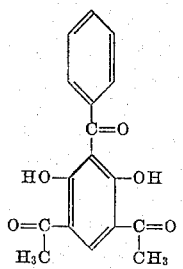

This compound is a crystalline solid soluble in many common organic solvents such as the lower alkanols, acetone, light petroleum fractions, and of very low solubility in water. It is useful as an insecticide and fungicide, and is adapted to be employed for the control of cockroaches.

The novel compound may be prepared by reacting benzoyl chloride and 4,6-diacetyl resorcinol in the presence of a catalyst which may be aluminum chloride. Conveniently, the reaction may be carried out in an inert liquid reaction medium such as o-dichlorobenzene. Good results are obtained when employing the benzoyl chloride reactant in substantial excess over the amount equimolecular with 4,6-diacetyl resorcinol, and an amount of aluminum chloride catalyst substantially in excess of that equimolecular with diacetyl resorcinol. The reaction is moderately exothermic, and takes place smoothly at temperatures of from 100 to 200° C.

In carrying out the reaction, the benzoyl chloride reactant, 4,6-diacetyl resorcinol reactant, and aluminum chloride catalyst are intimately mixed and blended together in the liquid reaction medium. The combining of the reactants may be carried out at room temperature. Thereafter, the resulting reaction mixture is heated to a temperature in the reaction temperature range, and maintained thereat for a period of time to carry the reaction to completion. Upon completion of the reaction, the desired product may be separated in known manners. In one such manner, the resulting reaction mixture is washed with a large excess volume of dilute hydrochloric acid, solvent removed with vaporization, and the resulting product residue recrystallized from a solvent which may be ethanol.

The following example illustrates the invention but is not to be considered as limiting it.

*Example*

Benzoyl chloride (26 grams; 0.185 mole), 19.4 grams (0.10 mole) of 4-6-diacetyl resorcinol, and 76 grams (0.57 mole) of aluminum chloride were intimately mixed and blended together in 450 milliliters of o-dichlorobenzene. The combining of the reactants took place at room temperature. The resulting reaction mixture was thereafter heated at 140° C. for 2 hours to carry the reaction to completion. Thereafter, the mixture was washed with a large excess of cold dilute hydrochloric acid, and solvent removed by vaporization at subatmospheric pressure. The resulting white solid product was taken up in ethanol, and desired product recrystallized therefrom. As a result of these operations, there was obtained a 3,5-diacetyl-2,6-dihydroxybenzophenone product melting at 216.0–217.0° C.

The present compound is especially adapted to be employed in the control of intestinal parasites of warm blooded animals. For such use, the unmodified compound may be employed. In an alternative procedure, the compound may be dispersed upon an inert finely divided solid and the resulting preparations employed, for oral administration, as feed additives, or enclosed in a capsule or compressed to form a bolus. Also, such preparations may be dispersed in water with or without a wetting agent and the resulting aqueous dispersion employed as oral drenches or in drinking water. In other procedures the compound may be employed in oil or as a constituent of oil-in-water or water-in-oil emulsions or as aqueous dispersions thereof which may be applied as spray, drench, or wash. In a representative operation the feeding in unrestricted quantity of a balanced commercial laboratory animal diet modified by the inclusion therein of the present compound in the concentration of 0.25 percent by weight over a period of 7 days to mice parasitized by *Ascaris lumbricoides suum* gave a 100 percent kill of the parasites without evident injury to the mice.

Various modifications of the process and products of the present invention may be made without departing from the spirit or scope thereof and it is to be understood that I limit myself only as defined in the appended claims.

I claim:
1. 3,5-diacetyl-2,6-dihydroxybenzophenone.
2. A method of preparing 3,5-diacetyl-2,6-dihydroxybenzophenone which consists of contacting benzoyl chloride and 4,6-diacetyl resorcinol in the presence of aluminum chloride.

References Cited in the file of this patent

UNITED STATES PATENTS 2,773,903    Hardy et al.   ------------ Dec. 11, 1956
2,891,996    Clark et al.   ------------ June 23, 1959